United States Patent
Nakamura et al.

(10) Patent No.: US 6,731,363 B2
(45) Date of Patent: May 4, 2004

(54) ANTI-GLARE, ANTI-REFLECTION FILM, POLARIZING PLATE AND LIQUID CRYSTAL DISPLAY DEVICE

(75) Inventors: Kazuhiro Nakamura, Kanagawa (JP); Naohiro Matsunaga, Kanagawa (JP)

(73) Assignee: Fuji Photo Film Co., Ltd., Minami Ashigara (JP)

( * ) Notice: Subject to any disclaimer, the term of this patent is extended or adjusted under 35 U.S.C. 154(b) by 130 days.

(21) Appl. No.: 09/984,963

(22) Filed: Oct. 31, 2001

(65) Prior Publication Data

US 2002/0085284 A1 Jul. 4, 2002

(30) Foreign Application Priority Data

Oct. 31, 2000 (JP) .................................. P.2001-332732
Sep. 13, 2001 (JP) .................................. P.2001-278503

(51) Int. Cl.[7] ............................................ G02F 1/1335
(52) U.S. Cl. ......................................... 349/137; 359/99
(58) Field of Search ............................. 349/137; 359/99

(56) References Cited

U.S. PATENT DOCUMENTS 5,919,555 A * 7/1999 Yasuda et al. ............... 428/206
6,040,881 A * 3/2000 Koyama ........................ 349/8
6,476,969 B2 * 11/2002 Oka et al. ..................... 359/582

FOREIGN PATENT DOCUMENTS

JP  07-287102 A  10/1995
JP  07-333404 A  12/1995

* cited by examiner

*Primary Examiner*—George Eckert
*Assistant Examiner*—Joseph Nguyen
(74) *Attorney, Agent, or Firm*—Burns, Doane, Swecker & Mathis, L.L.P.

(57) ABSTRACT

An object of the invention is to provide an anti-glare, anti-reflection film of which various characteristics such as anti-reflection, contamination resistance, scratch-resistance and transmission image sharpness, among which anti-reflection is particularly important, are consistent with a sufficiently high anti-glare property when the film is loaded in image display devices, in particular, a high-resolution liquid crystal display device, and which can be produced entirely by wet coating processes at a low manufacturing cost, and further provide a liquid crystal display excelling in image contrast, image visibility and image sharpness. The object is achieved by an anti-glare, anti-reflection film made of a low refractive index layer provided on a transparent support, and an anti-glare layer arranged between the transparent support and the low refractive index layer, the surface energy of the anti-glare layer being 25 mN·m$^{-1}$ to 70 mN·m$^{-1}$.

19 Claims, 1 Drawing Sheet

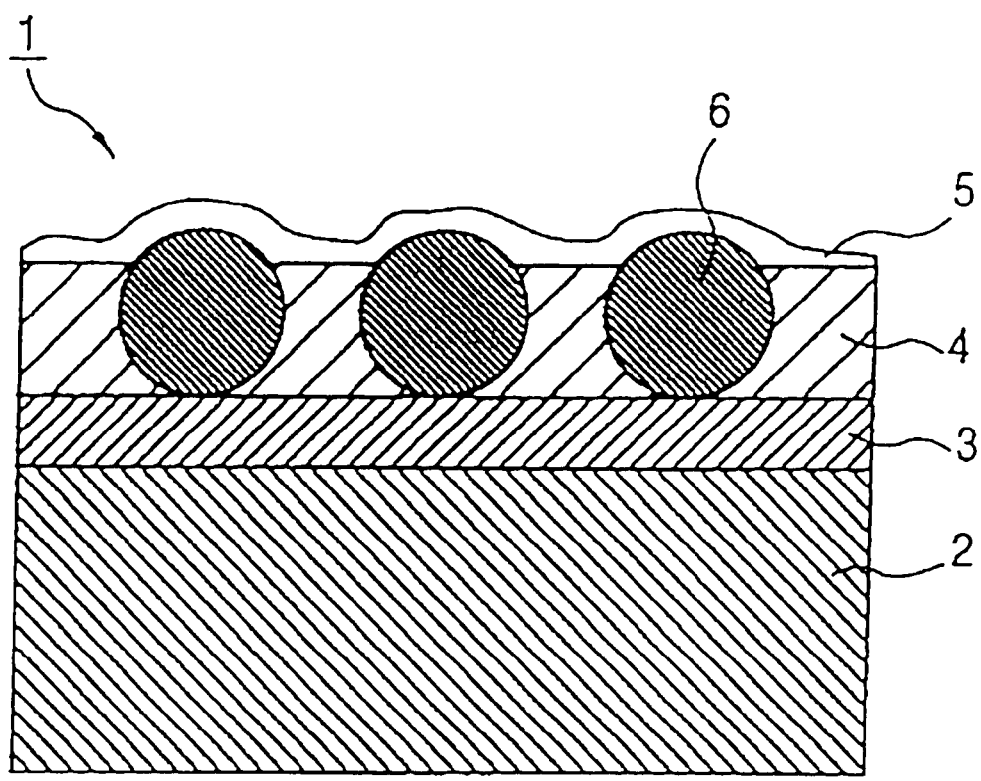

ANTI-GLARE, ANTI-REFLECTION FILM, POLARIZING PLATE AND LIQUID CRYSTAL DISPLAY DEVICE

BACKGROUND OF THE INVENTION

1. Field of the Invention

The present invention relates to an anti-reflection film provided with an anti-glare property, and to a polarizing plate and a liquid crystal display device using the anti-reflection film.

2. Description of the Related Art

An anti-reflection film is usually arranged at the outermost plane of an image display device such as LCD (Liquid Crystal Display), CRT or PDP in order to prevent contrast reduction or disturbance by reflected images due to the reflection of an external light. The mechanism of anti-reflection is based on the principle of optical interference.

However, in an anti-reflection film consisting only of a hard coat layer and a low refractive index layer provided on a transparent support, the low refractive index layer must have a very low refractive index to achieve a low reflectance. For example, in order to achieve a reflectance below 1.6% on the average between 450 and 650 nm by an anti-reflection film having a hard coat layer made of a UV-cured dipentaerythritol hexaacrylate provided on a tri-acetylcellulose support, the refractive index of the low refractive index layer must not exceed 1.40. As the material having a refractive index up to 1.40, inorganic compounds such as magnesium fluoride and potassium fluoride and fluorine-containing organic compounds with a high fluorine content are known. However, since all of these fluorine-containing compounds lack in sufficiently large cohesive energy, they show a poor scratch-resistance as a film forming the outermost surface of a display device. Accordingly, compounds having a refractive index not lower than 1.43 must have been used to secure a sufficient level of scratch-resistance.

Japanese Patent Laid-Open No. 287102/1995 discloses that one can reduce the reflectance by making the refractive index of the hard coat layer large. However, such a highly refractive hard coat layer is liable to yield non-uniformity in the film and cause a strong wavelength dependence of reflectance due to a large refractive index difference between the hard coat layer and the support.

Japanese Patent Laid-Open No. 333404/1995 describes an anti-glare, anti-reflection film excelling in gas barrier property as well as anti-glare and anti-reflection properties. However, the structure requires a silicon oxide film prepared by CVD as an essential component, and thus suffers from a poorer productivity compared with those made by wet coating in which a film is fabricated by coating a coating mixture. Moreover, the anti-reflection property achieved by such a structure was still insufficient.

Under the recent trend of rapid increase in the resolution of liquid crystal display devices, the pixel size of the liquid crystal cell approached to the dimension of the surface unevenness of the anti-glare layer. Then, the display image became accompanied by brightness non-uniformity resulting in giving the display observer an impression of glare. Such glare is reduced by increasing the amount of the matting agent of the anti-glare layer containing a binder and a particulate matting agent, since the dimension of the surface unevenness shortens. However, this countermeasure intensifies the glittering of external light at the same time, which raises the right front brightness of the black area under a bright surround, thus leading to the deterioration of right front contrast.

SUMMARY OF THE INVENTION

An object of the invention is to provide an anti-glare, anti-reflection film of which various characteristics such as anti-reflection, contamination resistance, scratch-resistance and transmission image sharpness, among which anti-reflection is particularly important, are consistent with a sufficiently high anti-glare property when the film is loaded in image display devices, in particular a high-resolution liquid crystal display device, and which can be produced entirely by wet coating processes at a low manufacturing cost.

Another object of the invention is to provide a liquid crystal display device excelling in image contrast as well as image visibility and sharpness.

The objects of the invention have been achieved with the films, polarizing plates or liquid crystal display devices as described below.

1. An anti-glare, anti-reflection film comprising a transparent support, at least one low refractive index layer and an anti-glare layer provided between the transparent support and the low refractive index layer, in which the surface energy of the anti-glare layer is from 25 $mN \cdot m^{-1}$ to 70 $mN \cdot m^{-1}$.

2. An anti-glare, anti-reflection film according to item 1 in which the surface energy of the anti-glare layer is from 35 $mN \cdot m^{-1}$ to 70 $mN \cdot m^{-1}$.

3. An anti-glare, anti-reflection film according to item 1 or 2 in which the haze value due to the internal scattering of the anti-glare layer is 1 to 60%.

4. An anti-glare, anti-reflection film according to one of items 1 to 3 in which the haze value due to the surface scattering of the anti-glare layer is 1 to 20%.

5. An anti-glare, anti-reflection film according to one of items 1 to 4 in which the anti-glare layer comprises a transparent binder composition and a particulate matting agent having a light-scattering effect, and the difference in refractive index between the transparent binder composition and the matting agent is in the range of from 0.02 to 0.2.

6. An anti-glare, anti-reflection film according to one of items 1 to 5 in which the anti-glare layer contains at least either of a fluorine-containing surfactant or a silicon-containing surfactant.

7. An anti-glare, anti-reflection film according to item 6 in which the anti-glare layer exhibits F/C, the ratio of the X-ray photoelectron spectroscopic peak associated with Fluorine atom to that associated with Carbon atom, not exceeding 0.40, and/or exhibits Si/C, the ratio of the X-ray photoelectron spectroscopic peak associated with Silicon atom to that associated with Carbon atom, not exceeding 0.30.

8. An anti-glare, anti-reflection film according to one of items 1 to 7 in which 50 to 100% by weight of the coating solvent of the coating mixture for the formation of the low refractive index layer has a boiling point up to 100° C. under 1 atom.

9. An anti-glare, anti-reflection film according to item 8 in which the low refractive index layer mainly comprises (i) a cured product of a fluorine-containing resin curable upon heat or ionizing radiation, or (ii) the cured product and an ultra-fine particulate silicon oxide, and in which the refractive index of the low refractive index layer does not exceed 1.45.

10. An anti-glare, anti-reflection film according to one of items 1 to 9 in which the transparent binder composition of the anti-glare layer mainly comprises a thermally or ionization radiatively cured product of the mixture comprising an ultra-fine particulate oxide of at least one metal selected from the group consisting of zirconium, titanium, aluminum, indium, zinc, tin and antimony, with a tri- or higher functional (meth)acrylate monomer, and in which the refractive index of the transparent binder composition is in the range of from 1.57 to 2.00.

11. An anti-glare, anti-reflection film according to item 10 in which the transparent binder composition comprises a UV-cured product of a composition containing an ultra-fine particulate zirconium oxide and a mixture of dipentaerithritol pentaacrylate and dipentaerythritol hexaacrylate (e.g., DeSolite Z-7041, a product of JSR Co., Ltd.).

12. An anti-glare, anti-reflection film according to one of items 1 to 11 in which the matting agent contained in the anti-glare layer is a particulate resin.

13. An anti-glare, anti-reflection film according to item 12 in which the particulate resin as the matting agent contained in the anti-glare layer is a cross-linked polystyrene.

14. An anti-glare, anti-reflection film according to one of items 1 to 13 in which the transparent support comprises a triacetylcellulose film that has been fabricated by a single-layer casting method or a plural-layer co-casting method with use of a triacetylcellulose dope prepared by dissolving triacetylcellulose in a solvent.

15. An anti-glare, anti-reflection film according to item 14 in which the triacetylcellulose dope is prepared by dissolving triacetylcellulose by a low temperature dissolving method or a high temperature dissolving method in a solvent substantially free of dichloromethane.

16. A polarizing plate comprising a polarizing layer and two protective layers provided on the opposite sides with respect to the polarizing layer, and at least one of the protective layers comprising the anti-glare, anti-reflection film according to one of items 1 to 15 as an anti-reflection layer.

17. A polarizing plate of item 16 in which the other of the two protective films than the anti-glare, anti-reflection film comprises an optically anisotropic layer provided on the transparent support acting also as a protective film whereby the optically anisotropic layer comprises a compound having adiscotic structural unit and exhibits a negative birefringence, the disc plane of the discotic structural unit being slanted to the transparent support plane, and the angle between the disc plane of the discotic structural unit and the transparent support plane varying along the depth direction of the optically anisotropic layer.

18. A liquid crystal display device in which the outermost layer of the display device comprises the anti-glare, anti-reflection film according to one of items 1 to 15, or the anti-reflection layer for a polarizing plate according to item 16 or 17.

19. A method for making an anti-glare, anti-reflection film having a transparent support, an anti-glare layer and a low reflective index layer, which comprises applying the anti-glare layer onto the transparent support, a surface energy of the anti-glare layer being 25 mN·m$^{-1}$ to 70 mN·m$^{-1}$, and then applying the low reflective index layer onto the anti-glare layer.

BRIEF DESCRIPTION OF THE DRAWING

FIG. 1 is a schematic cross-sectional view of an anti-glare, anti-reflection film showing the layer structure thereof.

DETAILED DESCRIPTION OF THE INVENTION

A basic structure of the anti-glare, anti-reflection film of the invention will be described with reference to FIG. 1.

FIG. 1 schematically illustrates the cross-sectional view of an exemplary layer structure of the anti-glare, anti-reflection film of the invention. In this embodiment, anti-glare, anti-reflection film 1 has a layer structure comprising transparent support 2 made of triacetylcellulose, hard coat layer 3, anti-glare layer 4 and low refractive index layer 5 arranged in this order. In anti-glare layer 4, particulate matting agent 6 are dispersed. The refractive index of the anti-glare layer is preferably 1.57 to 2.00, while that of the low refractive index layer is preferably 1.38 to 1.49.

As the transparent support used for the anti-glare, anti-reflection film of the invention, a triacetylcellulose film is employed that may form a mono-layer or multi-layers. A single triacetylcellulose layer can be produced by drum casting or band casting as described in Japanese Patent Laid-Open No. 11055/1995. On the other hand, the latter, multi-layered triacetylcellulose film, can be produced by the so-called co-casting process as disclosed in Japanese Patent Laid-Open Nos. 94725/1986 and 43846/1987.

Specifically, flakes as raw material are dissolved in a solvent such as halogenated hydrocarbons (e.g., dichloromethane), alcohols (e.g., methanol, ethanol or butanol), esters (e.g., methyl formate or methyl acetate), ethers (e.g., dioxane, dioxolane or diethyl ether), and to the solution various additives including a plasticizer, a UV absorber, a decomposition preventing agent, a slipping agent and a release promoting agent are added. The resulting mixture (which is often called a dope) is cast on a horizontal endless metal belt or a rotating drum support from a dope-supplying unit (called a die). In this operation, in the case of mono-layer casting, a single type of dope is cast, while in the case of multi-layer casting, a high concentration cellulose ester dope and a low concentration dope are simultaneously cast in such a manner that a layer of the former dope is sandwiched between two layers of the latter dope. After the cast layer(s) is (are) dried to a certain extent on the support to form a film (films) having a certain level of stiffness, the film(s) is (are) separated from the support, and conveyed by a variety of conveying means through a drying zone to evaporate the solvent.

The typical solvent used to dissolve triacetylcellulose is dichloromethane. Although halogenated hydrocarbons including dichloromethane can be used without any problem from the technical viewpoint, the solvent should preferably contain substantially no halogenated hydrocarbon such as dichloromethane from the viewpoints of environment protection and harmless working environment. The expression "contain substantially no halogenated hydrocarbon" means that the content of the halogenated hydrocarbon in the organic solvent does not exceed 5% by weight (preferable 2% by weight). To prepare a triacetylcellulose dope by using a solvent containing substantially no halogenated hydrocarbon such as dichloromethane, it is essential to use a special dissolving process to be described later.

A first dissolving process is called cooled dissolution as will be described below. In a solvent, triacetylcellulose is slowly added under stirring at a temperature around room temperature (−10 to 40° C.). Then, the mixture is cooled to −100 to −10° C. (preferably −80 to −10° C., more preferably −50 to −20° C., and still more preferably −50 to −30° C.). Cooling can be performed by means of, for example, a dry ice-methanol bath (−75° C.) or a cooled di(ethyleneglycol)

solution (−30 to −20° C.). When cooled to such an extent, the mixture of triacetylcellulose with the solvent solidifies. Thereafter, when the solidified mixture is heated to 0 to 200° C., preferably 0 to 150° C., more preferably 0 to 120° C., and still more preferably 0 to 50° C., a solution results in which the triacetylcellulose is fluidized by the solvent. The temperature elevation may be conducted only by leaving the mixture in a room temperature, or may be heated in a warming bath.

A second process is called high temperature dissolution as will be described below. Triacetylcellulose is slowly added into a solvent kept at a temperature between −10 and 40° C. In the preparation of a triacetylcellulose solution, it is preferable to swell triacetylcellulose in a mixture of various solvents in advance. Though, in the present process, the concentration of triacetylcellulose is preferably up to 30% by weight, a higher concentration is desirable from the viewpoint of the drying efficiency at film formation. Then, the mixture of triacetylcellulose and an organic solvent is heated, under a pressure of 0.2 to 30 MPa, to 70 to 240° C., preferably 80 to 220° C., more preferably 100 to 200° C., and still more preferably 100 to 190° C. Since the hot solution thus obtained cannot be coated just as it is, the solution must be cooled to a temperature not exceeding the boiling point of the most volatile compound in the solvent. Usually, the solution is cooled to −10 to 50° C., and then returned to an normal pressure. For such cooling, the high-pressure, high-temperature vessel as well as pipe lines containing the triacetylcellulose solution may be allowed to stand at an ambient temperature, but more preferably the vessel and lines may be cooled with use of a coolant such as chilled water.

In the anti-glare, anti-reflection film of the invention, a hard coat layer may be provided by coating between the transparent support and the anti-glare layer, if required and necessary, for the purpose of enhancing the scratch-resistance of the film.

The compound used in the hard coat layer is preferably a polymer having a primary chain comprising a saturated hydrocarbon or a polyether, in which the former type of polymer is particularly preferred. Such a binder polymer is preferably cross-linked.

A polymer having a saturated hydrocarbon primary chain is preferably prepared via a polymerization reaction of an ethylenically unsaturated monomer. To obtain a cross-linked binder polymer, monomers having two or more ethylenically unsaturated groups are preferably adopted.

Examples of the monomer having two or more ethylenically unsaturated groups include esters of a polyhydric alcohol with a (meth)acrylic acid (e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri (meth)acrylate, dipentaerythritol tetra(meth)acrylate, dipentaerythritol penta(meth)acrylate, dipentaerythritol hexa(meth)acrylate, 1,3,5-cyclohexanetriol trimethacrylate, polyurethane polyacrylate, or polyester polyacrylate), vinylbenzene derivatives (e.g., 1,4-divinylbenzene, the ethyl ester of 4-vinylbenzoic acid-2-acryloyl, or 1,4-divinylcyclohexanone), vinylsulfones (e.g., divinylsulfone), acrylamides (e.g., methylene-bis-acrylamide) and methacrylamides. Among these monomers, mixtures of dipentaerythritol pentaacrylate and dipentaerythritol hexaacrylate are particularly preferred, and they are commercially available.

Such a monomer having ethylenically unsaturated groups, which is dissolved in a solvent together with various additives such as a polymerization initiator, coated and dried, must be thereafter cured via a polymerization reaction promoted by the action of an ionizing radiation or heat.

Instead of or in addition to the monomer having two or more ethylenically unsaturated groups, a cross-linking structure may be introduced in the binder polymer by a reaction of a cross-linkable group. Examples of such a cross-linkable functional group include isocyanate, epoxy, azilidine, oxazoline, aldehyde, carbonyl, hydrazine, carboxyl, methylol and active methylene. Further, vinylsulfonic acid, an acid anhydride, a cyanoacrylate derivative, melamine, an etherized methylol, an ester and a urethane and a metal alkoxide such as tetramethoxysilane can also be used as the monomer or the ingredient for the introduction of a cross-linkable structure. A blocked isocyanate group, which exhibits a cross-linkable property as a result of a decomposition reaction, may also be used. In other words, the cross-linkable group cited above includes not only the compounds enumerated above but also those exhibiting reactivity upon decomposition.

These cross-linkable compounds must be cured by the action of heat, etc. after coating.

The refractive index of the raw material for the transparent binder composition used to form an anti-glare layer of the invention is preferably 1.57 to 2.00, more preferably 1.60 to 1.80. The refractive index of the raw material for the low refractive index layer is 1.38 to 1.49. The refractive index of triacetylcellulose preferably used for the transparent support is 1.48.

When the refractive index of the transparent binder composition used to form an anti-glare layer is too small, the anti-reflection capability is weakened. On the other hand, when the refractive index is excessively large, the coloration of the reflected light from the anti-reflection film is undesirably intensified. The anti-reflection capability is higher for a lower value of the refractive index of the low refractive index layer for the range of 1.38 to 1.49 along with an intensified coloration of the reflected light.

The anti-glare layer of the anti-glare, anti-reflection film of the invention has a haze value of 0 to 60%, preferably 1 to 60% for the component due to internal scattering, and that of 1 to 20% for the component due to internal scattering. Here, the haze value due to internal scattering indicates that observed when the transparent binder composition forming the anti-glare layer is overcoated so as to flatten the surface.

Internal scattering can be imparted to the anti-glare layer by making the refractive index difference between the following materials (a) and (b) equal to 0.02 to 0.2: (a) the transparent binder composition used to form the anti-glare layer, and (b) the matting agent the particle size of which is larger than the layer thickness thus acting to form a surface roughness, and/or fine particles having a particle size up to the layer thickness thus not contributing to surface roughness formation.

By imparting such internal scattering property to the film, one can markedly mitigate the glittering caused by the surface unevenness that acts as a lens to enlarge individual pixels when the film is applied to an image display device. In particular, when the film is adapted to a liquid crystal display device, an excellent display device can be obtained with an expanded viewing angle along all the directions including horizontal and vertical, by using in combination with a phase compensation film.

From the glitter-mitigating viewpoint, the haze value due to internal scattering should preferably be at least 1%, but when it exceeds 60%, the transmittance undesirably decreases.

Surface scattering essentially occurs by forming a surface roughness having a specific dimension to impart an anti-glare property to the film. A surface scattering below 1% fails to impart an anti-glare property, while one exceeding 20% causes an excessive back scattering, leading to film whitening exceeding the tolerance under a bright condition. In the case where the film is attached to a liquid crystal display device, a surface scattering below 1% causes disturbing reflection images to appear in the background, and for a surface scattering exceeding 20%, contrast deterioration takes place.

Materials used to form the anti-glare layer include, in addition to those constituting the above-cited hard coat layer, monomers or ultra-fine, particulate metal oxides both having a high refractive index.

Examples of monomers with high refractive indices include bis(4-methacryloylthiophenyl) sulfide, vinylnaphthalene, vinylphenyl sulfide and 4-methacryloxyphenyl-4'-methoxyphenyl thioether.

Examples of ultra-fine particulate metal oxides with high refractive indices include fine particles of the oxide of at least a metal selected from the group consisting of zirconium, titanium, aluminum, indium, zinc, tin and antimony, having a particle diameter of 100 nm or less, preferably 50 nm or less. Specific examples of such fine particulate materials include $ZrO_2$, $TiO_2$, $Al_2O_3$, $In_2O_3$, ZnO, $SnO_2$, $Sb_2O_3$ and ITO. Among these, $ZrO_2$ is particularly preferred for use.

The ultra-fine particulate metal oxide is added at an amount of 10 to 90% by weight of the total weight of the transparent binder composition, and more preferable at an amount of 20 to 80% by weight. By controlling this content value, one can arbitrarily establish the refractive index difference from the particulate matting agent to be described soon.

In the anti-glare layer, a particulate matting agent is incorporated in order to impart an anti-glare property, and prevent the reflectance decrease and uneven coloration caused by the interference with the hard coat layer. The particulate matting agent should preferably be transparent. The average particle size is preferably 1.0 to 5.0 $\mu$m, more preferably 1.7 to 3.5 $\mu$m in terms of the number-averaged value measured by the Coulter method. With an average particle diameter below 1.0 $\mu$m, the degree of anti-glare is not enough while with a diameter exceeding 5.0 $\mu$m the sharpness of the transmission image deteriorates.

The anti-glare layer preferably has a thickness of 0.5 to 10 .m, more preferably 0.8 to 7 .m.

As the particulate matting agent, inorganic particles or resin particles are used including, for example, amorphous silica particles, $TiO_2$ particles, $Al_2O_3$ particles, cross-linked acrylic polymer particles such as those made of cross-linked poly(methyl methacrylate), cross-linked polystyrene particles, melamine resin particles, benzoguanamine resin particles, and cross-linked polysiloxane particles. By taking into account the dispersion stability and sedimentation stability of the particles in the coating mixture for the anti-glare layer and/or the hard coat layer during the manufacturing process, resin particles are more preferred, and in particular cross-linked polystyrene particles are preferably used since resin particles have a high affinity to the binder material and a small specific gravity.

As for the shape of the particulate matting agent, spherical and amorphous particles can be used. However, to obtain a consistent anti-glare property, spherical particles are desirable. Two or more kinds of particulate materials may be used in combination.

Into the anti-glare layer or other layers, another particulate agent finer than the above-cited matting agent may further be incorporated which does not contribute to the anti-glare property, but imparts internal scattering property to the layer. These finer particles for internal scattering impartation preferably have a number-averaged particle diameter of 0.1 to 1.0 $\mu$m measured by the Coulter method.

In the preparation of the anti-glare layer of the invention, the coating mixture for anti-glare layer formation may contain a fluorine- and/or a silicon-containing surfactant for the purpose of securing a sufficient surface uniformity free of coating and drying non-uniformity and spotty defect. In particular, fluorine-containing surfactants are preferably used since they exhibit a prominent effect on the improvement of various surface defects, such as coating and drying non-uniformity or spotty defect, of the anti-glare, anti-reflection film of the invention with a small added amount.

Preferable examples of such fluorine-containing surfactants include nonionic surfactants containing a perfluoro-alkylsulfonic acid amide group such as Florad FC-431 (a product of Minnesota Mining & Manufacturing Co., Ltd.), and oligomers containing a perfluoroalkyl group such as Megafac F-171, F-172, F-173and F-176PF, all being products of Dai-nippon Ink and Chemicals, Inc. Examples of silicon-containing surfactants include polydimethylsiloxane derivatives in which the side chain or the main chain end is modified with a number of substituents such as ethylene glycol, propylene glycol or other oligomers.

When such a surfactant is used, however, the following problem takes place: since the F- or Si-containing functional group of the surfactant described above is localized at the surface of the anti-glare layer causing the surface energy of the anti-glare layer to decrease, the anti-reflection property deteriorates when a low refractive index layer is over-coated on the anti-glare layer. Such deterioration is assumed to occur because the wettability of the coating mixture used to form the low refractive index layer deteriorates, which presumably leads to form visually undetectable, high spatial frequency unevenness in the thickness of the low refractive index layer.

To solve the problem, the following two countermeasures proved effective. Firstly, by appropriately adjusting the structure of the fluorine- or silicon-containing surfactant and the addition level thereof, or by adding no such surfactant, the surface energy of the anti-glare layer is controlled within the range of from 25 to 70 $mN \cdot m^{-1}$, preferably from 35 to 70 $mN \cdot m^{-1}$, still more preferably from 40 to 70 $mN \cdot m^{-1}$. Secondly, as will be described later, 50 to 100% by weight of the coating solvent in the coating mixture for low refractive index layer formation is occupied by a solvent having a boiling point up to 100° C. under 1 atom.

Further, to achieve the surface energy value cited above, it is desirable that the anti-glare layer exhibits F/C, i.e., the ratio of the X-ray photoelectron spectroscopic peak associated with Fluorine atom to that associated with Carbon atom, not exceeds 0.40, and/or that it exhibits Si/C, i.e., the ratio of the X-ray photoelectron spectroscopic peak associated with Silicon atom to that associated with Carbon atom, not exceeds 0.30.

The low refractive index layer in the anti-glare, anti-reflection film of the invention should preferably satisfy the following formula (I).

$$m\lambda/4 \times 0.7 < n_1 d_1 < m\lambda/4 \times 1.3 \qquad \text{Formula (I)}$$

In the formula, m is a positive odd (generally 1), $n_1$ the refractive index of the low refractive index layer, and $d_1$ the thickness of the low refractive index layer in nm. λ is a wavelength between 500 and 550 nm.

Just to make sure, satisfaction of the above formula (I) implies that there exists a numeral m (a positive odd, usually being equal to 1) in the wavelength range cited above that satisfies formula (I).

In the low refractive index layer, a cured product of a fluorine-containing resin curable upon heat or ionizing radiation is used. The dynamic frictional coefficient of the cured product is preferably 0.03 to 0.15, and the contact angle thereof for water is preferably 90 to 120 deg.

As the curable fluorine-containing resin, silane compounds containing a perfluoroalkyl group (e.g., (heptadecafluoro-1,1,2,2-tetradecyl)triethoxysilane) and fluorine-containing copolymers containing a fluorine-containing monomer and a monomer capable of imparting a cross-linkable property are included.

Specific examples of the fluorine-containing monomer unit include fluoroolefins (e.g., fluoroethylene, vinylidene fluoride, tetrafluoroethylene, hexafluoroethylene, hexafluoropropylene or perfluoro-2,2-dimethyl-1,3-dioxol) partially or perfectly fluorinated alkyl ester derivatives of (meth) acrylic acid (e.g., Viscoat 6FM made by Osaka Yuki Kagaku and M-2020 made by Daikin) and partially or perfectly fluorinated vinyl ethers.

Specific examples of the monomer capable of imparting a cross-linkable property include those which contain a cross-linkable functional group in the molecule exemplified by glycidyl methacrylate, and (meth)acrylate monomers containing a functional group such as carboxyl, hydroxyl, amino or sulfonic acid (e.g., (meth)acrylic acid, methylol (meth) acrylate, hydroxyalkyl (meth)acrylate, and allyl acrylate). By using the monomers belonging to the latter group, a cross-linkable structure can be introduced after copolymerization as described in Japanese Patent Laid-Open Nos. 25388/1998 and 147739/1998.

Further, in addition to the polymers comprising the fluorine-containing monomer enumerated above, copolymers containing a monomer containing no fluorine atom may also be used. There is no restriction on such a copolymerizable monomer unit; specific examples thereof include olefins (ethylene, propylene, isoprene, vinyl chloride or vinylidene chloride), acrylic acid esters (methyl acrylate, ethyl acrylate or 2-ethylhexyl acrylate), methacrylic acid esters (methyl methacrylate, ethyl methacrylate, butyl methacrylate or ethylene glycol dimethacrylate), styrene derivatives (styrene, divinylbenzene, vinyltoluene, or α-methylstyrene), vinyl esters (vinyl acetate, vinyl propionate or vinyl cinnamate), acrylamides (N-tert-butylacrylamide or N-cyclohexylacrylamide), methacrylamides and acrylonitrile derivatives.

To the fluorine-containing resin used for the formation of the low refractive index layer, an ultra-fine particulate silicon oxide is preferably incorporated in order to provide scratch-resistance. From the anti-reflection viewpoint, the refractive index of the layer should be as low as possible. But decreasing the refractive index of the fluorine-containing resin causes the scratch-resistance to degrade. Thus, by optimizing the refractive index of the fluorine-containing resin as well as the addition level of the ultra-fine silicon oxide, the most appropriate balance between the scratch-resistance and the low refractive index can be achieved.

As the ultra-fine silicon oxide, a commercially available silica sol dispersed in an organic solvent may be added to the coating mixture as it stands, or a commercially available particulate silica may be dispersed in an organic solvent.

The coating mixture for the anti-glare layer of the anti-glare, anti-reflection film of the invention should preferably comprise a coating solvent system 50 to 100% by weight of which has a boiling point up to 100° C. under 1 atom. When a coating mixture for the low refractive index layer is coated on the anti-glare layer and then dried, the coating mixture flows along the unevenness present in the surface of the anti-glare layer, and causes the layer thickness to fluctuate on a visually undetectable minute area. Due to the thickness fluctuation, the reflectance becomes larger than the value predicted by a simulation. The slower is the drying speed of the coating solvent, the more the fluctuation becomes noticeable, thus leading to a higher reflectance. When the drying speed becomes below a certain value, a coating unevenness results which appears small spots detectable by the naked eye. Therefore, the solvent composition described hereinabove is preferred for the coating mixture used to form the low refractive index layer of the invention.

In cases where the ratio of the solvent having a boiling point not exceeding 100° C. at 1 atom does not reach 50% by weight, the reflectance unfavorably increases beyond a practically acceptable limit.

In contrast, by using a solvent system in which 0.1 to 50% by weight of the system is occupied by a solvent having a boiling point exceeding 100° C., drying unevenness or the whitening of the dried film can be prevented. By taking into consideration the prevention of reflectance increase, such solvent should preferably occupy 0.1 to 5% by weight of the total solvent system.

As the solvent having a boiling point up to 100° C. and used as the coating solvent of the coating mixture for the low refractive index layer, those in which the solid ingredients contained in the coating mixture are readily soluble may be preferably selected from ketones such as methyl ethyl ketone and acetone, esters such as ethyl acetate and methyl acetate, ether alcohols such as methyl cellosolve, and alcohols such as ethanol and methanol. A particularly preferable solvent is methyl ethyl ketone.

As the solvent having a boiling point exceeding 100° C. and used in an amount up to 50% by weight of the total solvent amount, use can be made of ketones such as cyclohexanone, cyclopentanone and methyl isobutyl ketone, ether alcohols such as diacetone alcohol and propylene glycol methyl ether and alcohols such as 1-butanol and 2-butanol, among which cyclohexanone is particularly preferred. In the case where the surface uniformity is sufficiently high without using any low volatile solvent, any of the enumerated solvent need not be added at all.

Each layer constituting the anti-reflection film can be formed by various coating methods including dip coating, air-knife coating, curtain coating, roller coating, wire bar coating, gravure coating, micro-gravure coating and extrusion coating (U.S. Pat. No. 2,681,294). Two or more layers may be coated simultaneously. As for simultaneous multi-layer coating, reference can be made to U.S. Pat. Nos. 2,761,791, 2,941,898, 3,508,947 and 3,526,528, and Kotingu Kogaku (Coating Engineering), authored by Yuji Harasaki, p. 253 (Asakura Shoten, 1973).

The anti-glare, anti-reflection film of the invention can be applied to various image display devices such as liquid crystal display (LCD), plasma display panel (PDP), electro luminescence display (ELD) and cathode ray tube display (CRT). The anti-glare, anti-reflection film of the invention is used as the outermost layer of the image display device whereby the transparent support side of the film is attached onto the image display plane of the device.

The polarizing plate, which comprises a polarizing film layer (polarizer) and a pair of protective films arranged on both sides of the polarizing film layer, is used for liquid crystal display devices. In the polarizing plate of such structure, the anti-glare, anti-reflection film can be used as one of the two protective films. The other protective film may be an ordinary cellulose acetate film.

The polarizing film includes an iodine-based polarizing film, a dichromatic dye-based film and polyene-based film. The iodine- and dye-based polarizing films are usually fabricated with use of a poly(vinyl alcohol) film.

The protective film for the polarizing film layer needs be subjected to saponification treatment to secure a desirable adhesive property. Since the anti-glare, anti-reflection film of the invention can stand saponification, it can be saponized just before attached to the polarizing film layer.

Though the saponification treatment can be conducted directly on the triacetylcellulose film, it may also be conducted after the formation of a hard coat layer or an anti-glare layer. However, by considering productivity, the treatment is preferably carried out during the fabrication of the polarizing plate after all the layers have been prepared.

In the invention, a polarizing plate having a structure to be described below is preferred: one of the paired protective films sandwiching the polarizing film is made of the anti-glare, anti-reflection film of the invention, while the other protective film comprises a transparent support acting as a transparent protective film and an optically anisotropic layer provided on the transparent protective film and comprising a liquid crystal compound.

The optically anisotropic layer may take a structure comprising a layer containing a disk-shaped (discotic) compound or a rod-like liquid crystal compound, provided on a transparent support (a polymer film). In the invention, a discotic compound is preferably employed as the liquid crystal compound. The optically anisotropic layer is preferably prepared by orienting the discotic compound or the rod-like liquid crystal compound, and then fixing the oriented state.

In general, discotic compounds exhibit large double refractive indices and can take versatile orientation polymorphs. Accordingly, by using a discotic compound, one can obtain an optically anisotropic layer having such optical properties as never attainable with conventional elongated birefringent films.

As a more preferable embodiment of the invention, the optically anisotropic layer comprises a compound having a discotic structural unit and exhibits a negative birefringence, the disc plane of the discotic structural unit is slanted to the transparent support plane, and the angle between the disc plane of the discotic structural unit and the transparent support plane varies along the depth direction of the optically anisotropic layer.

As for the optically anisotropic layer containing compounds having a discotic structural unit, provided on a transparent support, reference can be made to Japanese Patent Laid-Open No. 214116/1994, U.S. Pat. Nos. 5,583, 679 and 5,646,703 and West German Patent No. 3,911, 620A1.

The optically anisotropic layer can be applied to any known type of liquid crystal display device including transmission types such as TN, STN, OCB, IPS, MVA and PDLC, semi-transmission types such as TN, STN, HAN (reflective OCB) and PDLC, and refection types.

For a detailed explanation of the invention, some examples will be described below. However, the invention is not limited to those examples at all.

EXAMPLES (Preparation of Triacetylcellulose Dope A)

A raw stock consisting of 17.4 parts by weight of triacetylcellulose, 2.6 parts by weight of triphenyl phosphate, 66 parts by weight of dichloromethane, 5.8 parts by weight of methanol and 8.2 parts by weight of n-butanol was mixed with stirring for dissolution to prepare triacetylcellulose dope A.

(Preparation of Triacetylcellulose Dope B)

A raw stock consisting of 24 parts by weight of triacetylcellulose, 4 parts by weight of triphenyl phosphate, 66 parts by weight of dichloromethane and 6 parts by weight of methanol was mixed with stirring for dissolution to prepare triacetylcellulose dope B.

(Preparation of Triacetylcellulose Dope C)

Tiacetylcellulose dope C was prepared by mixing 20 parts by weight of triacetylcellulose, 48 parts by weight of methyl acetate, 20 parts by weight of cyclohexanone, 5 parts by weight of methanol, 5 parts by weight of ethanol, 2 parts by weight of a 1:2 mixture in weight ratio of triphenyl phosphate/biphenyldiphenyl phosphate, 0.1 parts by weight of silica (particle diameter: 20 nm), 0.2 parts by weight 2,4-bis-(n-octylthio)-6-(4-hydroxy-3,5-di-tert-butylanilino)-1,3,5-triazine, cooling the jelly, inhomogeneous solution obtained by agitating the above ingredients at −70° C. for 6 hours, and thereafter heating the solution to 50° C. and stirring.

(Preparation of Triacetylcellulose Dope D)

An inhomogeneous jelly solution obtained by the same way as in triacetylcellulose dope C was heated at 180° C. for 5 min under the application of 1 MPa pressure in a airtight-closed vessel made of stainless steel. Thereafter, the vessel was put into a 50° C. water bath for cooling to give triacetylcellulose dope D.

(Preparation of Anti-glare Layer (AGL)-forming Coating Mixture A)

Into 52 g of a methyl ethyl ketone/cyclohexanone mixture (mixing ratio in % by weight=54/46) were dissolved 91 g of a dipentaerythritol pentaacrylate/dipentaerythritol hexaacrylate mixture (DPHA, a product of Nippon Chemical and Engineering Co., Ltd.), and 218 g of a hard coat coating fluid containing an ultra-fine particulate zirconium oxide (particle size: about 30 nm) dispersion (DeSolite Z-7041, a product of JSR Co., Ltd.). To the resulting mixture was added and dissolved 10 g of a photopolymerization initiator (Irgacure 907, a product of Ciba Fine Chemicals, Inc.) with stirring. Then, 0.93 g of a fluorine-containing surfactant (Megafac F-176PF, a product of Dainippon Ink and Chemicals, Inc. ), which is a 20% by weight, methyl ethyl ketone solution of a fluorine-containing oligomer was added. The refractive index of a coating obtained by coating this solution followed by curing with UV light irradiation was 1.61.

Separately, a dispersion of a particulate cross-linked polystyrene was prepared as follows.

Into 80 g of a solvent mixture of methyl ethyl ketone/cyclohexanone (mixing ratio in % by weight=54/46) were dispersed 20 g of cross-linked polystyrene particles which has a number-averaged particle diameter of 1.99 $\mu$m with a standard deviation of 0.32 $\mu$m (which is equivalent to 16% of the number-averaged particle diameter) (Product name: SX-200HS, made by Souken Chemical and Engineering Co., Ltd.) by means of a high-speed disper operated at 5000 rpm with one hour agitation. The dispersion was then filtered with polypropylene filters with pore sizes of 10 $\mu$m, 3 $\mu$m and 1 $\mu$m (PPE-10, PPE-03 and PPE-01, respectively, all made by Fuji Photo Film Co., Ltd.) to give 29 g of filtrate.

The particulate cross-linked polystyrene dispersion thus prepared was added to the solution prepared above, and after stirring, the mixture was filtered through a polypropylene filter with 30 μm pore diameter to give AGL-forming coating mixture A.

(Preparation of AGL-forming Coating Mixture B)

Coating mixture B for the anti-glare layer was prepared by repeating the procedures for coating mixture A preparation except that the fluorine-containing surfactant was replaced to a silicon-containing surfactant (Silicone X-22-945, a product of Shin-etsu Chemical Co., Ltd.)

(Preparation of AGL-forming Coating Mixture C)

AGL-forming coating mixture C was prepared by repeating the procedures for the preparation of coating mixture A except that the fluorine-containing surfactant was wholly replaced to methyl ethyl ketone.

(Preparation of Coating Mixture D for the Anti-glare Layer)

AGL-forming coating mixture D was prepared by repeating the procedures for the preparation of AGL-forming coating mixture A except that the added amount of the fluorine-containing surfactant was changed to 3.72 g and that the amount of the methyl ethyl ketone/cyclohexanone mixed solvent (mixing ratio in % by weight=54/46) was changed from 52 g to 49 g.

(Preparation of AGL-forming Coating Mixture E)

Into 52 g of a methyl ethyl ketone/cyclohexanone mixture (mixing ratio in % by weight=54/46) were dissolved 75 g or a dipentaerythritol pentaacrylate/dipentaerythritol hexaacrylate mixture (DPHA, a product of Nippon Chemical and Engineering Co., Ltd.), and 240 g of a hard coat coating fluid containing an ultra-fine particulate zirconium oxide (particle size: about 30 nm) dispersion (DeSolite Z-7041, a product of JSR Co., Ltd.). To the resulting mixture was added and dissolved 10 g of a photopolymerization initiator (Irgacure 907, a product of Ciba Fine Chemicals, Inc.) with stirring. Then, 0.93 g of a fluorine-containing surfactant (Megafac F-176PF, a product of Dainippon Ink and Chemicals, Inc.), which is a 20% by weight, methyl ethyl ketone solution of a fluorine-containing oligomer was added. The refractive index of a coating obtained by coating this solution followed by curing with UV light irradiation was 1.65.

Separately, a dispersion of a particulate cross-linked polystyrene was prepared as follows.

Into 80 g of a methyl ethyl ketone/cyclohexanone mixture (mixing ratio in % by weight=54/46) were dispersed 20 g of cross-linked polystyrene particles which have a number-averaged particle diameter of 2.0 μm and a refractive index of 1.61 (Product name: SX-200HS, made by Souken Chemical and Engineering Co., Ltd.) by means of a high-speed disper operated at 5000 rpm with one hour agitation. The dispersion was then filtered with polypropylene filters with pore sizes of 10 μm, 3 μm and 1 μm (PPE-10, PPE-03 and PPE-01, respectively, all made by Fuji Photo Film Co., Ltd.) to give 29 g of filtrate.

The particulate cross-linked polystyrene dispersion thus prepared was added to the solution prepared above, and after stirring, the mixture was filtered through a polypropylene filter with 30 μm pore diameter to give AGL-forming coating mixture E.

(Preparation of AGL-forming Coating Mixture F)

AGL-forming coating mixture F was prepared by repeating the procedures for the preparation of AGL-forming coating mixture E except that the fluorine-containing surfactant was wholly replaced to methyl ethyl ketone.

(Preparation of AGL-forming Coating Mixture G)

AGL-forming coating mixture G was prepared by repeating the procedures for the preparation of AGL-forming coating mixture F except that 15 g of a dispersion prepared by dispersing 20 g of a particulate cross-linked polystyrene having a number-averaged particle diameter of 1.3 μm and a refractive index of 1.61 (trade name: SX-130H, a product of Souken Chemical & Engineering Co., Ltd.) into a methyl ethyl ketone/cyclohexanone mixture (mixing ratio in % by weight=54/46) by means of a high-speed disper operated at 5000 rpm with one hour agitation was used instead of the polystyrene dispersion used in coating mixture E.

(Preparation of Hard Coat Layer-forming Coating Mixture)

Into a mixture of 62 g methyl ethyl ketone and 88 g of cyclohexanone, 250 g of a UV light curable hard coat composition (DeSolite Z-7526, 72% by weight, a product of JSR Co., Ltd.) was dissolved. The refractive index of a coating obtained by coating this solution followed by curing with UV light irradiation was 1.50.

By filtering this solution through a polypropylene filter having a pore diameter of 30 μm (PPE-30), a hard coat layer-forming coating mixture was prepared.

(Preparation of Low Refractive Index Layer (LRIL)-forming Coating Mixture A)

To 93 g of a 6% by weight methyl ethyl ketone solution of a heat cross-linkable fluorine-containing polymer having a refractive index of 1.42 (JN-7228, a product of JSR Co., Ltd.), were added 8 g of MEK-ST (a $SiO_2$ sol dispersion in methyl ethyl ketone with a solid content of 30% by weight and an average particle diameter of 10 to 20 nm, a product of Nissan Chemical Co., Ltd.) and 100 g methyl ethyl ketone (boiling point =79.6° C. at 1 atom). After stirring, the mixture was filtered through a polypropylene filter (PPE-01) with a pore diameter of 1 μm to give rise to LRIL-forming coating mixture A.

(Preparation of LRIL-forming Coating Mixture B)

To 93 g of a 6% by weight methyl ethyl ketone solution of a heat cross-linkable fluorine-containing polymer having a refractive index of 1.42 (JN-7228, a product of JSR Co., Ltd.), were added 8 g of MEK-ST (a $SiO_2$ sol dispersion in methyl ethyl ketone with a solid content of 30% by weight and an average particle diameter of 10 to 20 nm, a product of Nissan Chemical Co., Ltd.), 94 g methyl ethyl ketone (boiling point under 1 atom=79.6° C.) and 6 g cyclohexanone. After stirring, the mixture was filtered through a polypropylene filter (PPE-01) with a pore diameter of 1 μm to give rise to LRIL-forming coating mixture B.

(Preparation of LRIL-forming Coating Mixture C)

To 93 g of a 6% by weight methyl ethyl ketone solution of a heat cross-linkable fluorine-containing polymer having a refractive index of 1.41 (JN-7219, a product of JSR Co., Ltd.), were added 8 g of MEK-ST (a $SiO_2$ sol dispersion in methyl ethyl ketone with a solid content of 30% by weight and an average particle diameter of 10 to 20 nm, a product of Nissan Chemical Co., Ltd.) and 100 g methyl isobutyl ketone (boiling point under 1 atom 115.9° C.). After stirring, the mixture was filtered through a polypropylene filter (PPE-01) with a pore diameter of 1 μm to give rise to LRIL-forming coating mixture C.

Example 1

According to Japanese Patent Laid-Open No. 254594/1999, a three-layer co-casting die was used to simultaneously cast dope A and dope B onto a metal drum in such a manner that two layers of dope A sandwich the layer of dope B. Then, the cast film was stripped off from the drum and dried to give a triacetylcellulose film comprising three co-cast layers each being 10, 60 and 10 μm thick from the drum side. In this film, no clear boundary was present between the adjacent layers.

On the triacetylcellulose film was coated the hard coat layer-forming coating mixture prepared above with a bar coater. After dried at 120° C., the hard coat layer was cured by UV light irradiation with an air-cooled metal halide lamp (a product of Eye Graphics Co., Ltd.) at 400 mW/cm² incident intensity so as to give the radiation amount of 300 mJ/cm². A 2.5 μm thick hard coat layer resulted.

On the cured hard coat layer, AGL-forming coating mixture A was coated with a bar coater, dried and cured by UV light in the same manner as the hard coat layer to form an anti-glare layer of about 1.5 μm thickness. The contact angles of the finished anti-glare layer to purified water and diiodomethane were measured, and the obtained values were substituted into the Owens' surface energy equation to give the surface energy of 31 mN·m$^{-1}$. Also, the value of F/C, which is obtained by dividing the X-ray photo-electron spectroscopically obtained peak area associated with Fluorine atom by the peak associated with Carbon atom, proved to be 0.28.

On the cured anti-glare layer, LRIL-forming coating mixture A was coated, dried at 80° C., and further thermally cross-linked at 120° C. for 8 min to form a low refractive index layer of 0.096 μm thickness.

Example 2

A hard coat layer was formed in the same manner as in Example 1 on a triacetylcellulose film made by mono-layer drum casting (TD 80U, a product of Fuji Photo Film Co., Ltd.).

On the hard coat layer, AGL-forming coating mixture B was coated and UV-cured as in Example 1 to provide an anti-glare layer of about 1.5 μm thickness. The surface energy and Si/C were measured to give the values of 29 mN·m$^{-1}$ and 0.12, respectively.

On the cured anti-glare layer, LRIL-forming coating mixture was coated and thermally cross-linked B as in Example 1 to provide a low refractive index layer of 0.096 μm thickness.

Example 3

An anti-glare, anti-reflection film was prepared as in Example 1 except that a 80 μm thick triacetylcellulose film comprising a single layer prepared by casting triacetylcellulose dope C on a drum accordingly to Japanese Patent Laid-Open No. 11055/1995 was used as the transparent support. The surface energy and F/C were measured to give the same values as in Example 1 of 31 mN·m$^{-1}$ and 0.28, respectively.

Example 4

An anti-glare, anti-reflection film was prepared as in Example 1 except that a 80 μm thick triacetylcellulose film comprising a single layer prepared by casting triacetylcellulose dope D on a drum according to the method disclosed in Japanese Patent Laid-Open No. 11055/1995 was used as the transparent support. The surface energy and F/C were measured to give the same values as in Example 1 of 31 mN·m$^{-1}$ and 0.28, respectively.

Example 5

An anti-glare, anti-reflection film was prepared as in Example 1 except that AGL-forming coating mixture A was replaced to AGL-forming coating mixture C. The surface energy and F/C of the anti-glare layer were measured to give 43 mN·m$^{-1}$ and 0.007, respectively.

Example 6

An anti-glare, anti-reflection film was prepared as in Example 1 except that AGL-forming coating mixture A was replaced to AGL-forming coating mixture E. The surface energy and F/C of the anti-glare layer were measured to give 31 mN·m$^{-1}$ and 0.28, respectively.

Example 7

An anti-glare, anti-reflection film was prepared as in Example 1 except that AGL-forming coating mixture A was replaced to AGL-forming coating mixture F. The surface energy and F/C of the anti-glare layer were measured to give 43 mN·m$^{-1}$ and 0.007, respectively.

Example 8

An anti-glare, anti-reflection film was prepared as in Example 1 except that AGL-forming coating mixture A was replaced to AGL-forming coating mixture G. The surface energy and F/C of the anti-glare layer were measured to give 43 mN·m$^{-1}$ and 0.007, respectively.

Comparative Example 1

An anti-glare, anti-reflection film was prepared by forming a hard coat layer, an anti-glare layer and a low refractive index layer as in Example 1 except that AGL-forming coating mixture D was used. The surface energy and F/C of the anti-glare layer were measured to give 22 mN·m$^{-1}$ and 0.53, respectively.

Comparative Example 2

An anti-glare, anti-reflection film was prepared by forming a hard coat layer, an anti-glare layer and a low refractive index layer as in Example 1 except that AGL-forming coating mixture D and LRIL-forming coating mixture C were used. The surface energy and F/C of the anti-glare layer were measured to give 22 mN·m$^{-1}$ and 0.53, respectively.

(Evaluation of Anti-glare, Anti-reflection Film)

Each film thus obtained was evaluated as for the following items. The results are shown in Table 1.

(1) Mirror Reflectance

With a spectrometer V-550 (made by Jasco Ltd.) equipped with an adapter ARV-474, the mirror reflectance was measured at an incident angle of +5° and an emergent angle of −5° over the wavelength range of 380 to 780 nm. By calculating the average reflectance over the range of 450 to 650 nm, the anti-reflectance capability was evaluated.

(2) Integral Reflectance

With a spectrometer V-550 (made by Jasco Ltd.) equipped with an adapter ILV-471, the integral of reflectance at every emergent angle at an incident angle of +5° was measured over the wavelength range of 380 to 780 nm whereby a standard white plate was placed at an emergent angle of −5°. This value is called integral reflectance. The average reflectance over the range of 450 to 650 nm was calculated.

(3) Haze Value

The haze characteristics of each film obtained hereinabove was measured with a haze meter, MODEL 1001DP (a product of Nippon Denshoku Kogyo Co., Ltd.). The internal haze was measured with a film prepared as follows. The film comprising only the support and the anti-glare layer was over-coated with the binder component contained in the anti-glare layer so as to have a surface roughness Ra not exceeding 0.01. The external haze was obtained by subtracting the internal haze from the haze value for the finished film comprising all the layers including the low refractive index layer.

(4) Evaluation of Anti-glare Capability

A naked fluorescent lamp without a louver (8000 cd/m²) was reflected in the anti-glare film prepared hereinabove, and the degree of blur of the reflected image was evaluated according to the following criteria.

The outline of the fluorescent lamp is perfectly unrecognizable: A

The outline of the fluorescent lamp is faintly recognized: B

Though the image of the fluorescent lamp is blurred, the outline is recognizable: C The image of the fluorescent lamp looks almost clear: D (5) Glittering The film was loaded in the LCD plane of Mevius PC-PJ2-X4 (a product of Sharp Electric Co., Ltd.) having a LCD pannel of 110 ppi resolution, and the degree of glittering of a green solid image was evaluated according to the following criteria.

No glittering is recognized: A
Very slight glittering is recognized: B
Slight glittering is recognized: C
Glittering is recognized: D (6) Scratch-resistance The degree of scratching that resulted from 10 back and forth rubbings with a #0000 steel wool under 200 g loading was evaluated according to the following criteria.

No scratch is formed: A
Faint scratches are formed but not noticeable: B
Though scratches are formed, the low refractive index layer remains: C
Scratches are formed over the entire area: D horizontal directions were very wide, thus giving a liquid crystal display device provided with excellent viewing characteristics.

Comparative Example 1 was unallowable as a commercial product because of the deterioration of the reflective property after the coating of the anti-glare layer.

Comparative Example 2 exhibited a poorer reflective property and a deteriorated glittering when loaded in a 110 ppi LCD, and a deteriorated scratch-resistance against steel wool rubbing all due to the low surface energy of the anti-glare layer. Moreover, since the solvent for the low refractive index layer evaporated slowly, a fluctuation having a visually recognizable unit was formed in the layer thickness, thus degrading the display image quality tremendously.

The anti-glare, anti-reflection film of the invention satisfies simultaneously all the requirements of anti-glaring, anti-reflection, contamination resistance, scratch-resistance and transmission image sharpness, when loaded in an image display device, in particular, a high-resolution liquid crystal display device, and can be produced entirely by wet coating processes at a low manufacturing cost.

This application is based on Japanese patent applications JP 2000-332732, filed Oct. 31, 2000, and JP 2001-278503, filed Sep. 13, 2001, the entire contents of each of which are hereby incorporated by reference, the same as if set forth at length.

TABLE 1

|  | Mirror reflectance (%) | Integral reflectance (%) | Haze value (%) internal/external | Anti-glare capability | Glittering | Scratch-resistance |
| --- | --- | --- | --- | --- | --- | --- |
| Example 1 | 1.0 | 1.8 | 0.1/15 | B | C | B |
| Example 2 | 1.0 | 1.9 | 0.1/15 | B | C | B |
| Example 3 | 1.0 | 1.8 | 0.1/15 | B | C | B |
| Example 4 | 1.1 | 1.8 | 0.1/15 | B | C | B |
| Example 5 | 0.9 | 1.7 | 0.1/15 | B | C | B |
| Example 6 | 0.9 | 1.7 | 5/17 | B | B | B |
| Example 7 | 0.8 | 1.7 | 5/15 | B | B | B |
| Example 8 | 0.8 | 1.7 | 41/15 | A | A | B |
| Comparative Example 1 | 1.4 | 2.6 | 0.1/15 | B | C | B |
| Comparative Example 2 | 1.6 | 2.8 | 0.1/15 | B | D | D |

The results for the Examples and Comparative Examples listed in Table 1 indicate the following conclusions.

In particular, Examples 6 to 8, which exhibited no glittering when loaded in the 110 ppi LCD, excelling in the balance of reflectance and anti-glare capability, gave high quality display images.

When a liquid crystal cell was fabricated by using the anti-glare, anti-reflection film of Example 8 as the protective film for the outer surface of the polarizing plate arranged at the observing side of a transmission-type TN liquid crystal, and a viewing angle expanding film, Wide View Film (WV-12A, a product of Fuji Photo Film Co., Ltd.) (WV-12A has an optical compensation layer in which the disc plane of a discotic structural unit is slanted to the transparent support, and in which the angle between the disc plane of the discotic structural unit and the transparent support plane varies along the depth direction of the optically anisotropic layer.) both at the liquid crystal cell side of the polarizing plate and at the liquid crystal cell side of the back-light, no glittering was recognized, image contrast under a bright indoor illumination was high, and the viewing angles along the vertical and

What is claimed is:

1. An anti-glare, anti-reflection film comprising: a transparent support; at least one low refractive index layer; and an anti-glare layer provided between the transparent support and the low refractive index layer, wherein the anti-glare layer has a surface energy of 25 mN·m$^{-1}$ to 70 mN·m$^{-1}$.

2. An anti-glare, anti-reflection film according to claim 1, wherein the anti-glare layer has a surface energy of 35 mN·m$^{-1}$ to 70 mN·m$^{-1}$.

3. An anti-glare, anti-reflection film comprising: a transparent support; at least one low refractive index layer; and an anti-glare layer provided between the transparent support and the low refractive index layer, wherein the anti-glare layer has a surface energy of 25 mN·m$^{-1}$ to 70 mN·m$^{-1}$, wherein the anti-glare layer has a haze value due to the internal scattering of 1 to 60%.

4. An anti-glare, anti-reflection film according to claim 1, wherein the anti-glare layer has a haze value due to the internal scattering of 1 to 20%.

5. An anti-glare, anti-reflection film according to claim 1, wherein the anti-glare layer comprises a transparent binder composition and a particulate matting agent having a light-scattering effect, and the difference in refractive index between the transparent binder composition and the matting agent is in the range of from 0.02 to 0.2.

6. An anti-glare, anti-reflection film according to claim 1, wherein the anti-glare layer further comprises at least one of a fluorine-containing surfactant and a silicon-containing surfactant.

7. An anti-glare, anti-reflection film comprising: a transparent support; at least one low refractive index layer; and an anti-glare layer provided between the transparent support and the low refractive index layer, wherein the anti-glare layer has a surface energy of 25 mN·m$^{-1}$ to 70 mN·m$^{-1}$, wherein the anti-glare layer further comprises at least one of a fluorine-containing surfactant and a silicon-containing surfactant, wherein the anti-glare layer exhibits F/C, the ratio of the X-ray photoelectron spectroscopic peak associated with fluorine atom to that associated with carbon atom, not exceeding 0.40, and/or exhibits Si/C, the ratio of the X-ray photoelectron spectroscopic peak associated with silicon atom to that associated with carbon atom, not exceeding 0.30.

8. An anti-glare, anti-reflection film according to claim 1, wherein 50 to 100% by weight of a coating solvent of a coating mixture for forming the low refractive index layer has a boiling point up to 100° C. under 1 atmosphere.

9. An anti-glare, anti-reflection film comprising: a transparent support; at least one low refractive index layer; and an anti-glare layer provided between the transparent support and the low refractive index layer, wherein the anti-glare layer has a surface energy of 25 mN·m$^{-1}$ to 70 mN·m$^{-1}$, wherein the low refractive index layer comprises one of (i) a cured product of a fluorine-containing resin curable upon heat or ionizing radiation, and (ii) the cured product and an ultra-fine particulate silicon oxide, and the low refractive index layer has a refractive index of 1.45 or less.

10. An anti-glare, anti-reflection film according to claim 1, wherein the anti-glare layer comprises a transparent binder composition; the transparent binder composition comprises a thermally or ionization radiatively cured product of the mixture comprising an ultra-fine particulate oxide of at least one metal selected from the group consisting of zirconium, titanium, aluminum, indium, zinc, tin and antimony, with a tri- or higher functional (meth)acrylate monomer; and the transparent binder composition has a refractive index of 1.57 to 2.00.

11. An anti-glare, anti-reflection film according to claim 10, wherein the transparent binder composition comprises a UV-cured product of a composition containing an ultra-fine particulate zirconium oxide and a mixture of dipentaerithritol pentaacrylate and dipentaerythritol hexaacrylate.

12. An anti-glare, anti-reflection film comprising: a transparent support; at least one low refractive index layer; and an anti-glare layer provided between the transparent support and the low refractive index layer, wherein the anti-glare layer has a surface energy of 25 mN·m$^{-1}$ to 70 mN·m$^{-1}$, wherein the anti-glare layer comprises a particulate matting agent having a light-scattering effect, and the particulate matting agent is a particulate resin.

13. An anti-glare, anti-reflection film according to claim 12, wherein the particulate resin is a cross-linked polystyrene.

14. An anti-glare, anti-reflection film according to claim 1, wherein the transparent support comprises a triacetylcellulose film that has been prepared by casting a triacetylcellulose dope prepared by dissolving triacetylcellulose in a solvent, by one of a single-layer casting method and a multi-layer co-casting method.

15. An anti-glare, anti-reflection film according to claim 14, wherein the triacetylcellulose dope is prepared by dissolving triacetylcellulose in a solvent substantially free of dichloromethane by one of a low temperature dissolving method and a high temperature dissolving method.

16. A polarizing plate comprising: a polarizing layer; a first protective layer provided on one side of the polarizing layer; and a second protective layer provided on the other side of the polarizing layer, wherein the first protective layer comprises an anti-glare, anti-reflection film according to claim 1.

17. A liquid crystal display device comprising an uppermost layer, wherein the uppermost layer is an anti-glare, anti-reflection film according to claim 1.

18. A method for making an anti-glare, anti-reflection film having a transparent support, an anti-glare layer and a low reflective index layer, which comprises coating the anti-glare layer onto the transparent support, a surface energy or the anti-glare layer being 25 mN·m$^{-1}$ to 70 mN·m$^{-1}$, and then applying the low refractive index layer onto the anti-glare layer.

19. A polarizing plate according to claim 16, wherein the second protective layer comprises an optically anisotropic layer comprising a liquid crystal compound and a transparent support.

* * * * *

UNITED STATES PATENT AND TRADEMARK OFFICE
CERTIFICATE OF CORRECTION

PATENT NO.    : 6,731,363 B2
DATED         : May 4, 2004
INVENTOR(S)   : Kazuhiro Nakamura et al.

It is certified that error appears in the above-identified patent and that said Letters Patent is hereby corrected as shown below:

Title page,
Item [30], Foreign Application Priority Data, change "P.2001-332732" to -- P.2000-332732 --.

Signed and Sealed this

Fourteenth Day of December, 2004

JON W. DUDAS
*Director of the United States Patent and Trademark Office*